May 4, 1954 F. A. GRABARCZYK 2,677,411
RESILIENTLY MOUNTED SEAT STRUCTURE
Filed Dec. 7, 1951 5 Sheets-Sheet 1
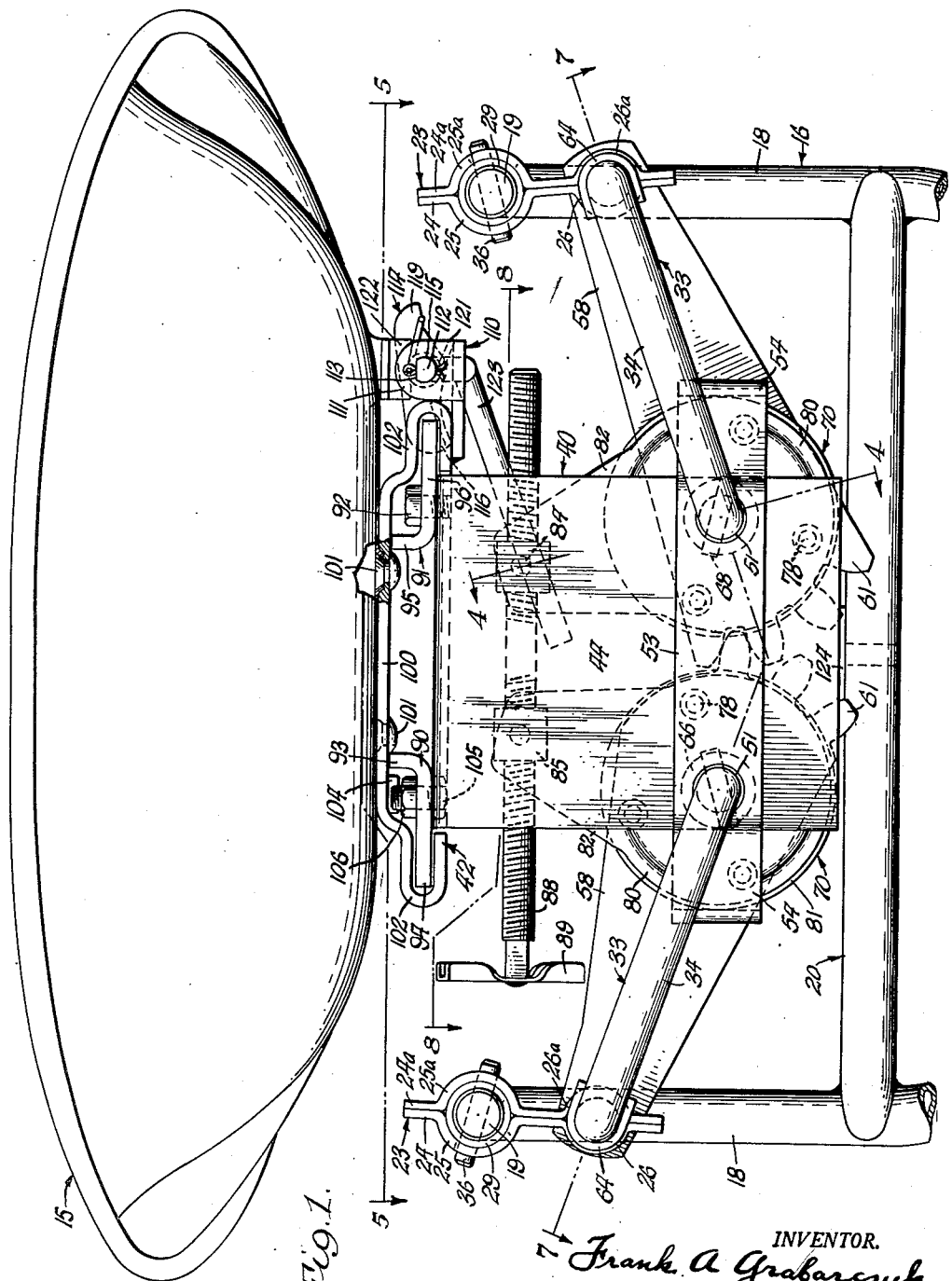
INVENTOR.
Frank A. Grabarczyk
BY
Popp and Sommer
ATTORNEYS

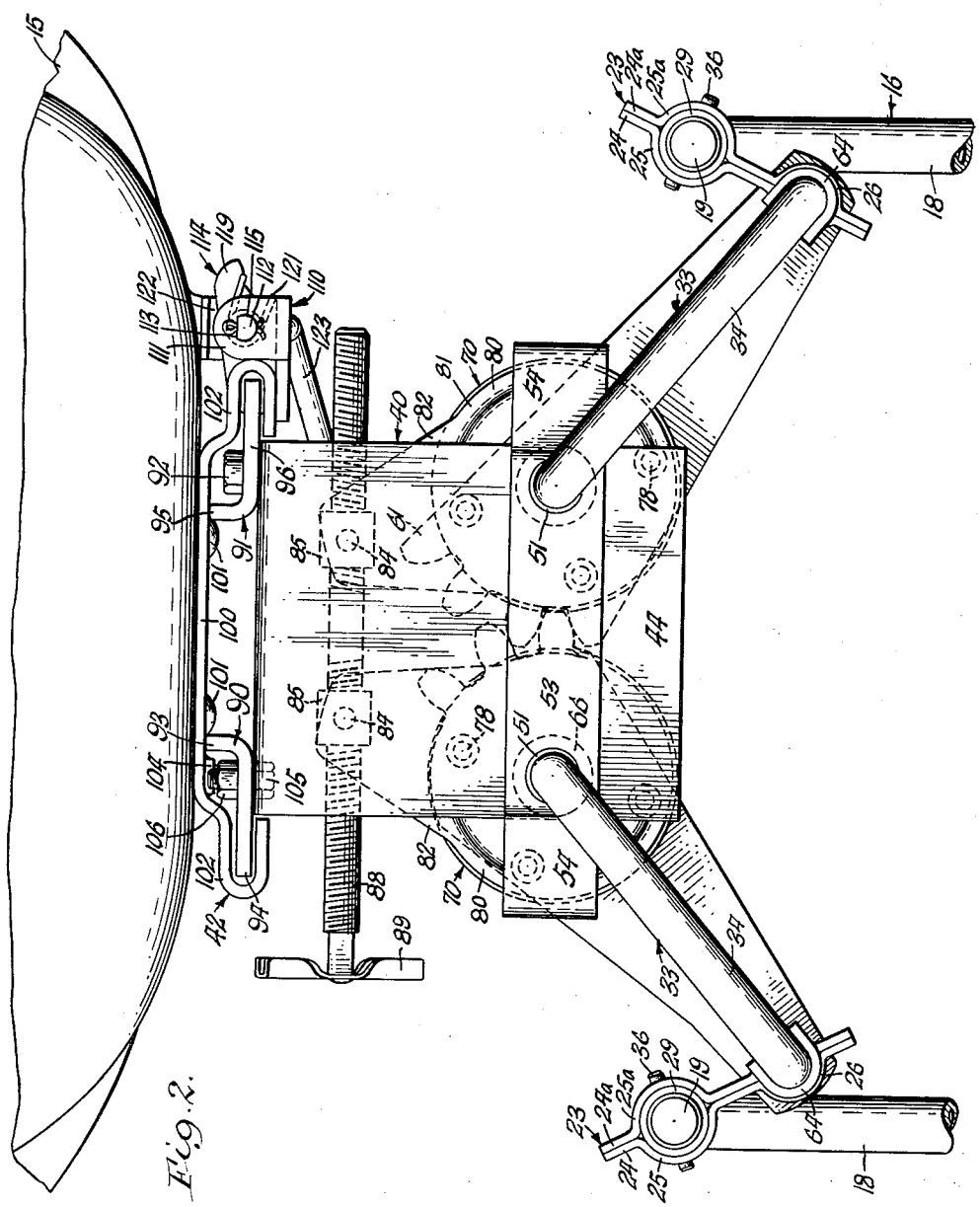

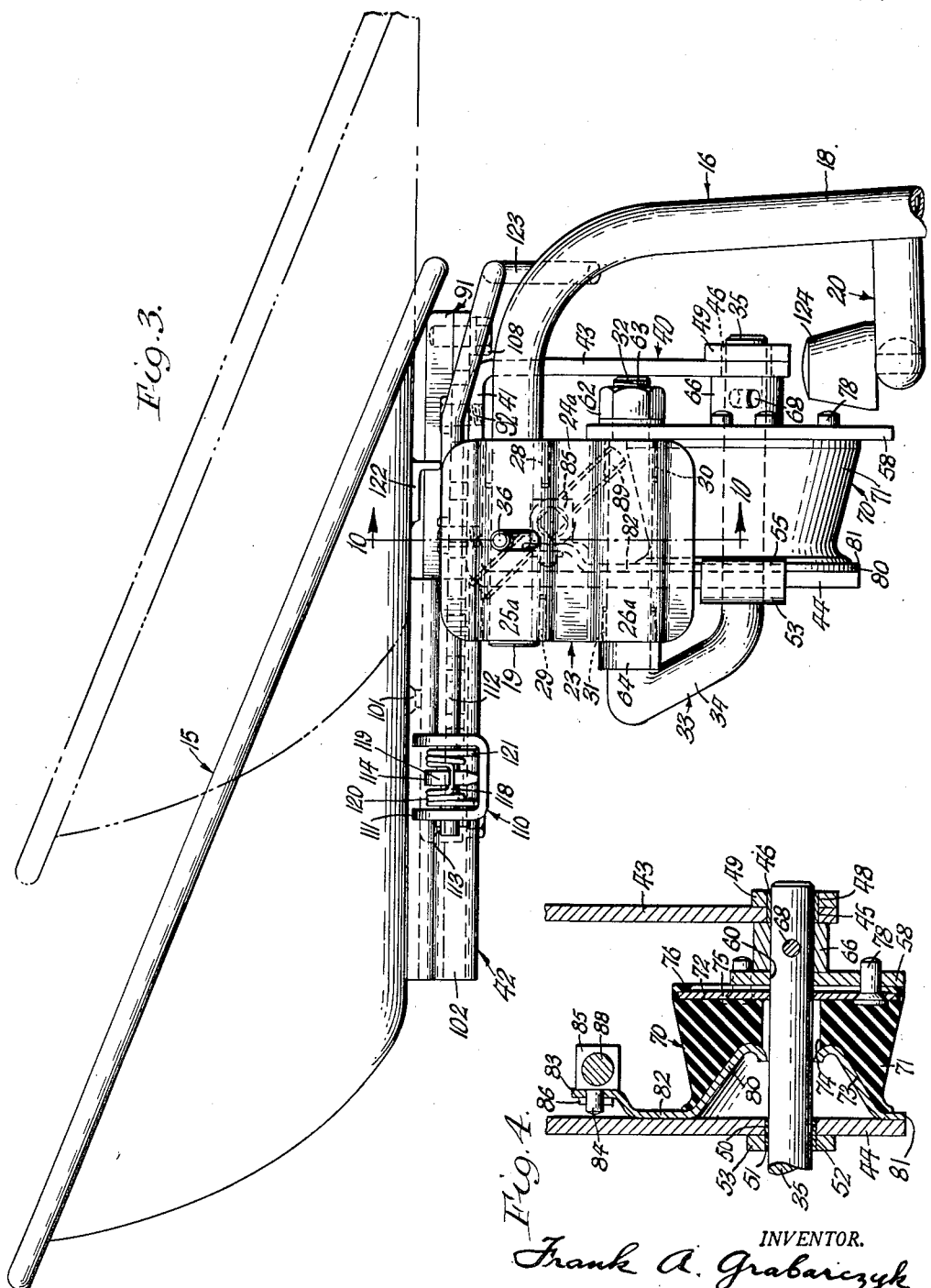

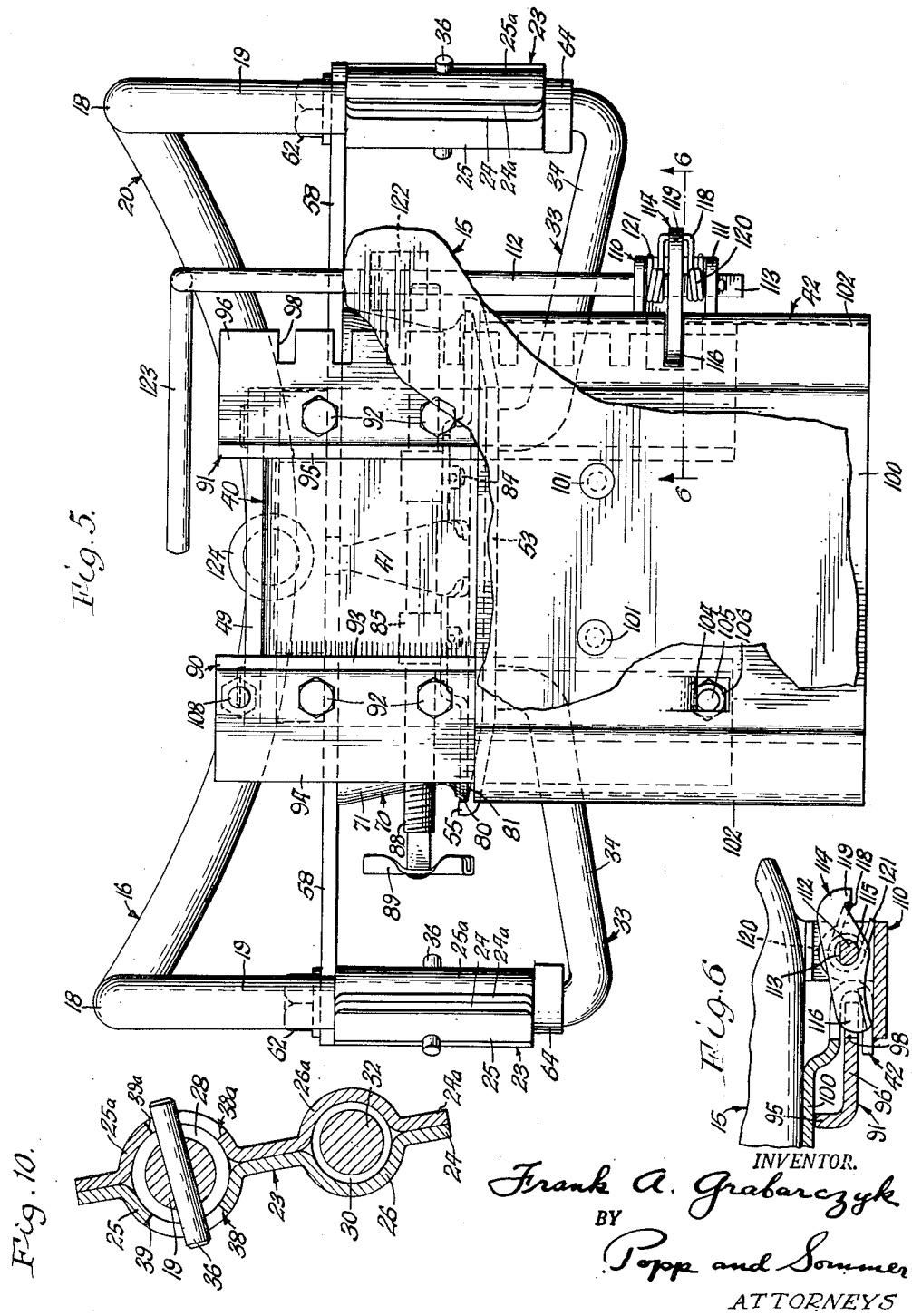

May 4, 1954  F. A. GRABARCZYK  2,677,411
RESILIENTLY MOUNTED SEAT STRUCTURE
Filed Dec. 7, 1951                             5 Sheets-Sheet 5
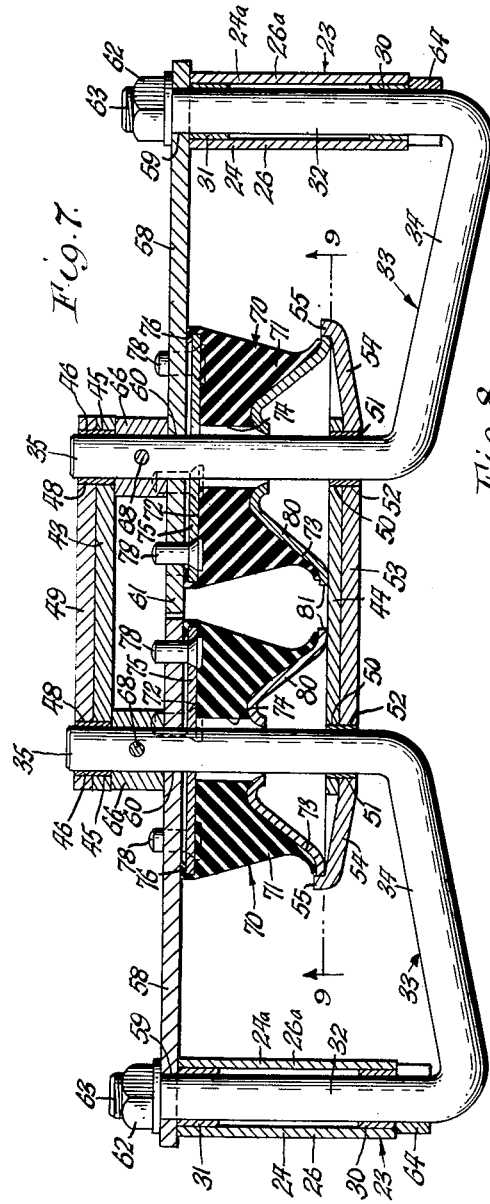
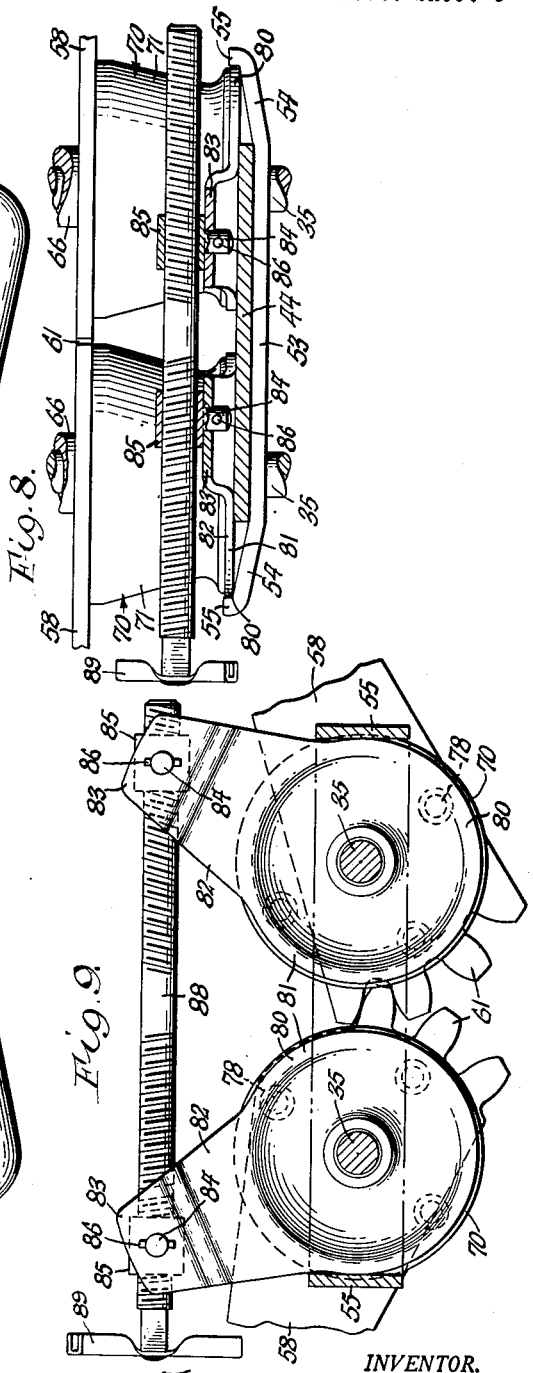
INVENTOR.
Frank A. Grabarczyk
BY
Popp and Sommer
ATTORNEYS Patented May 4, 1954

2,677,411

UNITED STATES PATENT OFFICE 2,677,411

RESILIENTLY MOUNTED SEAT STRUCTURE

Frank A. Grabarczyk, Milwaukee, Wis., assignor to Hickman Industries, Inc., Eden, N. Y., a corporation of New York Application December 7, 1951, Serial No. 260,471

14 Claims. (Cl. 155—50)

This invention relates to a seat structure and more particularly to such a seat structure, such as is shown in the Albert F. Hickman patent applications Serial No. 746,678 filed May 8, 1947, now Patent No. 2,590,859, dated April 1, 1952, and Serial No. 120,239 filed October 8, 1949, both for seat suspensions designed primarily for use with extremely rough riding vehicles such as farm tractors and military vehicles, features of the seat structure being capable for use in railroad locomotives and highway trucks.

In common with the said Hickman patent applications, the important objects of the present invention are to provide a seat structure, (1) in which the seat part is permitted to move against a geometric resilient resistance, both laterally and vertically, relative to the vehicle on which the seat is mounted; (2) which provides the maximum safety and comfort and leaves the occupant in full control of all controls of the vehicle; (3) in which the seat moves with the occupant and is not drawn or jerked away from the occupant whenever the pressure imposed by the occupant upon the seat becomes negative; (4) which will operate in a highly desirable frequency range regardless of the weight of the occupant; (5) which can be designed, within practicable limits, to have any desired frequency and any desired resistance curve; (6) which reduces and cushions both the vertical and lateral impacts against the seated occupant without imposing undue thrust on the connections between the seat part and the vehicle; (7) in which torsion springs are employed to provide a longer and variable spring resistance range; (8) in which the resilient support is provided by torsion springs which are simple, compact, low in cost and have long life and freedom from service difficulties; (9) in which geometric resilient resistance is obtained in a compact structure which requires little servicing and is free from noise; (10) in which the load from the seat to the suspension and from the suspension to its base part is distributed at a plurality of spaced points; (11) in which both fore-and-aft and lateral tilting of the seat is prevented, (12) which is made of a plurality of low cost and sturdy subassemblies which can be easily coupled together; (13) which includes a simple and low cost shackle structure; and (14) which is extremely compact and sturdy and which will stand up under conditions of severe and constant use with very little servicing.

A specific object of the present invention is to provide a very simple and rugged crank arm structure between the base shackles and the movable seat part, the crank arm structure being in the form of a rod bent into U-shaped form to provide, parallel end rods on which the shackles and bearings of the movable seat part are respectively journalled, and the extremities of these ends being connected by flat secondary crank arms to form closed or box yokes.

Another specific object is to simplify the equalizing mechanism of the said Hickman applications by the simple provision of inter-meshing teeth in the adjacent ends of the said secondary crank arms and which compel both crank arm structures to oscillate in unison.

Another specific object is to simplify the mounting of rubber torsion springs for the suspension, this being achieved by arranging each spring between the primary and secondary crank arms of such a crank arm structure and around the fulcrum end of the U-shaped rod and further by the provision of a simple connection between one axial end of each spring to the corresponding secondary flat crank arm and by interconnecting the other ends of the rubber springs by simple lever arms and adjusting screws.

Another specific object of the present invention is to provide a simple mechanism for adjusting the seat part of the seat structure fore-and-aft with reference to the suspension to adapt the seat to drivers of different height.

Another specific object of the invention is to provide a lighter and stronger mounting for the rubber torsion springs surrounding the fulcrum rods of the crank arms, this being accomplished by mounting these rubber torsion springs inboard or between the depending parts of a bracket supporting the movable seat rather than outboard of these depending parts.

Another specific object of the invention is to lighten the suspension by the distribution of loads in such manner as to avoid the necessity for more rigid and heavy parts.

Another specific object of the present invention is to provide a simple, light and readily accessible adjustment for the degree of windup of the rubber springs.

Another specific object is to provide simple and adequate stops for limiting the upward movement of the seat part with reference to the base part of the seat structure.

Another specific object is to provide simple and effective shackles for the suspension.

Other objects and advantages of the present invention will be apparent from the following description and drawings in which:

Fig. 1 is a rear elevational view of a seat structure embodying the present invention and shown as mounted on a supporting or base part, the seat being shown in its normal loaded position.

Fig. 2 is a fragmentary view similar to Fig. 1 and showing the position of the parts when the seat is completely unloaded.

Fig. 3 is a side elevational view of the structure shown in Fig. 1 and with the seat in an extreme depressed loaded position, such as when loaded and encountering a bump in the road. The dot-dash lines illustrates the forward position of adjustment of the bucket seat on which the rider sits.

Fig. 4 is a fragmentary generally vertical section taken on line 4—4, Fig. 1 through one of the rubber springs.

Fig. 5 is a horizontal section taken generally on line 5—5, Fig. 1 with parts broken away.

Fig. 6 is a fragmentary vertical section taken on line 6—6, Fig. 5.

Fig. 7 is a generally horizontal sectional view taken generally on line 7—7, Fig. 1.

Fig. 8 is a fragmentary horizontal section taken generally on line 8—8, Fig. 1.

Fig. 9 is a vertical section taken generally on line 9—9, Fig. 7.

Fig. 10 is a vertical section taken generally on line 10—10, Fig. 3.

The seat suspension embodying the present invention is designed primarily for use where rough riding or extreme vertical and lateral impact conditions are encountered, such as with farm tractors, railroad locomotives and military vehicles, where lateral as well as vertical stability is required, and to this end the seat part 15 of the seat structure is shown as being in the form of a sheet metal bucket type of seat or saddle and is carried by a supporting structure 16 which latter is suitably fixed to the farm tractor or other vehicle on which the seat structure is used.

While the base part or supporting structure can be of any suitable construction to suit the particular installation and use of the seat part, of the seat structure, the form of the base part as illustrated comprises a welded tubular structure 16 having a pair of laterally spaced risers or posts 18 arranged toward the front of the seat 15 and each having at its upper end a horizontally rearwardly projecting horn or extension 19. The posts or risers 18 are connected below their horns 19 by a tubular cross bar 20 welded at its ends to the posts, and this cross bar is preferably of arcuate shape having its central part disposed in rear of a line connecting the posts or risers 18 as best shown in Figs. 3 and 5.

The horizontally rearwardly projecting horns or extensions 19 carry a pair of shackles indicated generally at 23 and each of these shackles comprising a pair of complementary stamped plates 24, 24a. Inasmuch as these plates are substantially identical in construction, the description of one will be deemed to apply to both, the corresponding parts of the plate 24a being distinguished by the suffix a. Each shackle plate is provided with a semi-cylindrical off-set 25 extending parallel with and adjacent to its upper edge and is provided with a second semi-cylindrical off-set 26 parallel with and below the first off-set, the plate being of substantial extent lengthwise of the axis of these off-sets. Each pair of plates 24, 24a are welded together, as by spot welding, and the complementary mating semi-cylindrical off-sets 25, 25a form a bore in the front end of which is fitted a bearing 28 and in the rear end of which is fitted a bearing 29. Each pair of these bearings journal the rearwardly extending horn or extension 19 of the tubular supporting structure 16.

In the cylindrical bore provided by each other pair of mating semi-cylindrical off-sets 26, 26a are fitted a front bearing 30 and a rear bearing 31. Each pair of these bearings journals the forwardly projecting crank rod 32 of a one piece U-shaped crank arm indicated generally at 33, this crank arm having a crank arm portion 34 and a fulcrum rod 35 projecting forwardly from the end of this crank arm 34 opposite the crank rod 32. The crank arm structure 33 is preferably in the form of a single rod bent to provide its component parts and the crank arm portions 34 of both of the U-shaped crank arms 33 preferably diverge outwardly and rearwardly, as best shown in Fig. 7.

It will be noted that by reason of the substantial fore-and-aft extent of the plates 24, 24a of each shackle 23 the bearings in each pair of bearings 28, 29 and 30, 31 are spaced a substantial distance of each other fore-and-aft so that each pair of shackle plates, in effect, provides a pair of shackles spaced from each other fore-and-aft of the seat structure and connected together.

Means are also provided for limiting the swinging movement of each shackle 23, particularly to limit swinging of these shackles toward each other, this providing a limit for the upward movement of the seat, as hereinafter described in detail.

For this purpose a stop pin 36 extends transversely through each of the rearwardly projecting horns or extensions 19 of the tubular supporting structure 16 and the ends of each of these pins project outwardly from its horn or extension 19 through slots 38, 38a provided in the shackle plates 24, 24a respectively. These slots are of such length that their ends 39, 39a engage the ends of the corresponding pin 36 at the end of a predetermined inward movement of the lower ends of the shackles 23 toward each other, thereby to limit the upward movement of the bucket seat 15 as hereinafter described. The downward movement of the bucket seat 15 is limited by a rubber bumper, also as hereinafter described.

The fulcrum rods 35 of the crank arm structures 33 jointly support a U-shaped sheet metal bracket indicated generally at 40 on the upper horizontal cross part 41 of which the bucket seat 15 is mounted through an adjusting mechanism, indicated generally at 42, and to be later described in detail. The U-shaped supporting bracket 40 is made of a heavy sheet of metal having its forward end bent downwardly to provide a depending front plate or member 43 integral with and projecting downwardly from the forward edge of the horizontal cross part 41 of the bracket. Similarly the rear end of the bracket is bent downwardly to provide a vertical rear plate or member 44 integral with and depending from the rear edge of the cross part 41 of the bracket. The depending front plate 43 of this U-shaped bracket is provided with a pair of holes 45 in each of which is fitted a bearing 46 in which the forward extremity of the fulcrum rod 35 is journalled. To provide adequate bearing area, each of these bearings 46 is of greater axial length than the thickness of the depending plate 43, best shown in Fig. 7, and is also fitted in a bore 48 of a horizontal bar or plate 49, this bar or plate extending horizontally across the lower horizontal edge of the front plate 43 and being suitably secured, as by welding, to the front face thereof.

The depending rear plate 44 of the U-shaped bracket 40 is provided with a pair of holes 50 in each of which is fitted a bearing 51 in which the rear end of the corresponding fulcrum rod 35 is journalled. To provide adequate bearing area each of these bearings 51 is of greater axial length than the thickness of the depending rear plate 44, as best shown in Fig. 7, and is also fitted in a bore 52 of a horizontal bar or plate 53, this bar extending horizontally across the lower part of the rear plate 44 and being secured, as by welding, to the rear face thereof. The ends 54 of this rear horizontal cross bar 53 project beyond the vertical side edges of the depending rear plate 44 of the bracket and each is provided with a forwardly projecting lip 55 for a purpose which will presently appear.

The two U-shaped crank arm structures 33, 33 are connected to rise and fall in unison so as to prevent sidewise tipping of the bucket seat 15 supported thereby. For this purpose a pair of secondary crank arms 58 are provided each of which is in the form of a flat plate having a hole 59 at its outer end in which the forward extremity of the corresponding crank rod 32 of the crank arm is fitted; having a hole 60 intermediate its ends in which the front part of the corresponding fulcrum rod 35 of the crank arm structure 33 is fitted; and also having, under the central part of the bucket seat 15, gear teeth 61, these gear teeth providing a gear segment and the teeth 61 of one of the arms 58 meshing with the gear teeth 61 of the other arm 58, as best shown in Figs. 7 and 9.

The outer end of each of these secondary crank arms 58 is arranged against the forward end of the corresponding shackle structure 23 and each secondary crank arm 58, shackle structure 23, and crank rod 32 are held in assembled relation by a nut and washer 62 applied to the threaded forward extremity 63 of the crank rod 32 of the crank arm structure 33. The nut 62 holds the shackle structure 23 against a stop or thrust member 64, this stop or thrust member being in the form of a U-shaped piece of metal with its curved part embracing and welded to the crank rod 32 and with its legs straddling part of the bend between the crank rod 32 and the crank arm 34. The U-shape of this stop makes for easy application thereof especially across this bend. The intermediate part of each of these secondary crank arms 58 is held in rearwardly spaced relation to the depending front plate 43 of the bracket 40 by a spacing collar 66 which also serves as a thrust bearing to limit forward movement of the corresponding fulcrum rod 35 with reference to the depending front plate 43 of the U-shaped bracket 40. Each thrust and spacing collar 66 is preferably pinned to its fulcrum rod 35, as indicated at 68.

The springs for yieldingly supporting the bucket seat 15 in an elevated position comprise a pair of rubber torsion springs, indicated generally at 70. Each of these rubber torsion springs 70 can be of any suitable construction and is shown as comprising a frusto-conical body 71 of rubber having a flat forward face 72 and having a concave inner face 73, this rubber body being provided with an oversize axial bore 74 through which the corresponding fulcrum rod 35 extends. To the outer flat face 72 of each rubber body 71 is vulcanized a metal disk 75. The rubber body 71 preferably extends around the marginal part of this metal disk 75 in the form of a bead 76 and this bead of each rubber body engages the rear face of the corresponding secondary crank arm 58. Each plate 75 rotates with the corresponding secondary crank arm 58 and for this purpose, before vulcanizing the rubber body 71 to each disk 75 a plurality of pins 78 are inserted through holes provided in the disk 75 and with the ends of their heads imbedded in the rubber, these pins projecting axially through holes provided in the corresponding secondary crank arm 58 as best shown in Figs. 4 and 7.. While any number of these pins 78 can be employed, three pins are shown for each rubber spring.

To the opposite concave face 73 of each rubber body 71 is vulcanized a convex metal anchoring member or plate 80, this anchoring plate having an outwardly projecting marginal flange 81. This marginal flange bears against the forward face of the rear depending plate 44 of the supporting bracket 40 at the inner side of this flange and its outer side of this flange bears against the rear face of the projecting extremity 54 of the reinforcing bar or plate 53. The lips 55 at the ends of these projections of this reinforcing bar or plate 53 serve to hold the convex plates 80 and rubber bodies 71 in coaxial relation to the fulcrum rods 35.

Means are provided for readily adjusting the initial stress or degree of windup of the rubber springs 70 and for this purpose these rubber springs are interconnected by a mechanism which simultaneously adjusts both of the rubber springs in making this adjustment.

For this purpose, as best shown in Figs. 4 and 9, the flange 81 of the convex rear plate 80 of each rubber spring 70 is continued outwardly at one side to provide a lever arm 82. As best shown in Figs. 8 and 4 the outer end of each of these lever arms is also offset forwardly as indicated at 83. The pivot pin 84 of a nut 85 extends through a hole provided in each of these off-set portions 83 of each lever arm 82, the assembled relation of this pivot pin and lever arm being maintained by a retaining pin 86. One of the nuts 85 is right hand and the other of these nuts is left hand and these nuts jointly support a screw 88 each end of which is threaded to correspond to the nut 85 mounted thereon, the opposite ends of this screw being therefore reversely threaded. The screw 88 can be manually turned in any suitable manner, as by the provision of a small handle 89 welded or otherwise secured to one end of this screw. It will be seen that turning the handle 89 and the screw 88 in one direction operates to draw the two nuts 85 together thereby to move the lever arms 82 toward each other and increase the initial degree of tension or wind-up of the springs, this initial tension on the springs serving to bottom the stop pins 36 against the shoulders 39, 39a of the shackle structures, these stop pins limiting the upward movement of the bucket seat 15.

The adjusting mechanism 42 is for the purpose of permitting adjustably positioning the bucket seat 15 fore-and-aft with reference to the spring suspension on which it is mounted, different positions of such adjustment being illustrated by the full and broken lines in Fig. 3. This adjusting mechanism includes a pair of rails 90, 91, each secured by a pair of bolts 92 to the upper horizontal cross part 41 of the U-shaped supporting bracket 40. The rail 90 is L-shaped in cross-section having a relatively low upstanding flange 93 and a relatively wide horizontal flange 94. This rail is secured as viewed in Fig. 5 to the left hand side of the cross-plate 41 of the supporting bracket 40, to extend fore-and-aft of the seat structure and with its horizontal flange 94 projecting outwardly beyond the left hand side of the supporting bracket 40. The rail 91 is of similar L-shaped form, having a relatively low upstanding flange 95 and a relatively wide horizontal flange 96. The rail 91 is parallel with the rail 90 and its flange 96, as viewed in Fig. 5, extends beyond the right hand side of the supporting bracket 40. This extending portion of the flange 96 of the rail 91 is provided with a regularly spaced series of rectangular notches 98.

A plate 100 is suitably secured to the underside of the bucket seat 15, this securement being shown as being effected by a pair of rivets 101 as best shown in Figs. 1 and 5. This plate 100 has a pair of C-shaped flanges 102 along its opposite edges and these C-shaped flanges embrace the projecting portions of the horizontal flanges 94 and 96 of the rails 90 and 91, respectively. The plate 100 rides on the upstanding flanges 93 and 95 of these rails 90, 91 and the C-shaped flanges 102 prevent lateral and upward displacement of the bucket seat 15 and plate 100 while permitting fore-and-aft sliding movement of the bucket seat 15 and plate 100 relative to the rails 90 and 91.

This movement, in a rearward direction, is limited by a lip 104 struck downwardly from the plate 100 at one side thereof in position to come into contact with the shank of a bolt 105, the shank of this bolt extending upwardly through an opening in the rear end of the rail 90 and being retained on this rail by a nut 106. The forward movement of the bucket seat is limited by a screw 108 screwed upwardly through a threaded opening in the horizontal flange 94 of the rail 90 and in position to be engaged by this same stop lug 104 which is off-set downwardly from the plate 100.

To hold the bucket seat 15 in any intermediate position, a small bracket 110 is welded to the underside of one of the C-shaped flanges 102 of the plate 100 near the central part of this C-shaped flange. This small bracket 110 has a pair of upstanding ears 111 which are arranged in fore-and-aft alinement and which are provided with alining holes in which an adjusting rod 112 is journalled. The rear end of this rod 112, including the portion extending through the ears 111 of this small bracket 110, is shown as provided with a flat 113 so as to be out-of-round in cross section. A latching dog 114, as best shown in Fig. 6, is provided with an opening 115 which is also out-of-round to fit the out-of-round rear end of the adjusting rod 112 so as to be compelled to turn therewith. This dog is interposed between the ears 111 and has a tooth 116 extending toward the center of the bucket seat and is adapted to be lowered into any of the notches 98 depending upon the fore-and-aft positioning of the bucket seat 15 and plate 100 with reference to the rail 91. Upon turning the adjusting rod 113 clockwise, as viewed in Fig. 6, the tooth 116 is lifted to a position above the horizontal flange 96 of the rail 91 and hence is lifted out of the occupied notch 98 so as not to interfere with the manual adjustment of the bucket seat 15 and plate 100 with reference to this rail 91.

Spring means are provided for yieldingly holding the tooth 116 downwardly and thereby hold the bucket seat 15 latched against fore-and-aft movement with reference to the spring suspension. While such spring means can be of any suitable construction, the spring is shown as comprising a U-shaped central portion 118 which engages under a tailpiece 119 of the dog 114. The legs of this U-shaped central portion 118 are wound into helixes 120 which encircle the adjusting rod 112. The end extremities 121 of each of these helixes projects into engagement with the outer edge of the bottom plate of the bracket 110. The tension of the helixes 120 is such as to spread the ends 121 from the U-shaped central part 118 thereby to urge the tailpiece 119 of the dog 114 upwardly and hold the tooth 116 depressed and in latched engagement with a notch 98.

The forward end of the rod 112 is engageable with the underside of the small angle 122 welded to the underside of the bucket seat 15 and the extreme forward end of this adjusting rod 112 is bent to form an operating handle 123. This handle is lifted to move the tooth 116 of the dog 114 to an inoperative position and this lifting force is brought against the L-shaped angle 122.

As previously indicated the spring suspension bottoms against a rubber bumper, this bumper being indicated at 124 and being mounted on the central part of the arcuate cross bar 20 of the tubular support 16. This bumper 124 is in line with the lower edge of the front depending leg 43 of the U-shaped bracket 40 and also in line with the reinforcing cross bar 49.

The suspension is shown in Fig. 2 in its fully elevated or unloaded position and in the remaining figures it is shown in the position which it occupies under extreme load conditions, that is, when loaded and when the seat has been depressed by striking a substantial bump in the road or field.

In the operation of the suspension, the upward movement of the tractor, through the tubular supporting structure 16 and its rearwardly projecting horns 19 imposes an upward force against the shackle structures 23. This swings the shackles structures inwardly toward each other and also elevates the crank rods 32 to swing the outer ends of the crank arms 34, 58 upwardly, the crank rods 32 oscillating in their bearings 30 and 31. The fulcrum rods 35 of these crank arms oscillate about their bearings 46 and 51. These bearings 46, 51 are secured in the U-shaped supporting bracket 40 which, through the adjusting mechanism 42, carries the sheet metal bucket seat or saddle 15, these bearings being secured in the depending front and rear members or plates 43, 44 of this U-shaped supporting bracket 40.

The oscillation of each crank arm 58 is yieldingly resisted by the corresponding rubber spring 70, this movement of each of these crank arms 58 being transmitted through the pins 78 to the disk 75 vulcanized to the forward end face 72 of the rubber body 71 of the spring. The rear end of each rubber body 71 is vulcanized to the convex anchoring plate 80, and hence the force so imposed on the rubber body 71 is transmitted to the arms 82 of these rear plates 80 of the rubber spring. The two arms 82 are adjustably connected together by their swing nuts 85 and the reversely threaded screw 88 and hence it will be seen that these connected arms 82 provide a non-rotating anchorage for the rear ends of the rubber springs.

Lateral tipping of the seat or saddle 15 is prevented by the gear teeth 54 interconnecting the secondary crank arms 58. These gear teeth compel these crank arms to oscillate in unison and since these crank arms 58 at each side of the seat structure are connected by the shackle structures 23 with the corresponding horns 19 of the tubular supporting structure, it will be seen that the bucket seat or saddle 15 is prevented from tipping laterally by so compelling the crank arms 58 to rotate in unison.

At the same time the bucket seat or saddle 15 is capable of lateral movement and this movement is yieldingly permitted by a lateral cushioning provided by the rubber springs 70. This lateral movement of the bucket seat or saddle 15 is permitted by the shackle structures 23 which tend to cause the bucket seat or saddle 15 to centralize and stabilize itself in a transverse direction. These shackles permit this bucket seat or saddle 15, together with the occupant thereof, to move substantially straight ahead despite a certain amount of lateral movement of the tractor and the tubular supporting structure 16 connected therewith.

When this supporting structure 16 is so forced upwardly relative to the bucket seat or saddle 15, the effective opposing forces of the rubber torsion springs 70 increase at a geometric rate and not at an arithmetic rate. In this particular case, the geometric rate is of the accelerated increase type in which increments of vertical movement of the tubular supporting structure 16 are opposed by the accelerated rate of resilient resistance. This is primarily due to the progressive decrease in the effective leverage of the crank arms 34 and 58 as they swing upwardly and inwardly about their axes of rotation concentric with the rubber springs 70.

This geometric action also occurs when the tubular supporting structure 16 moves downwardly relative to the bucket seat or saddle 15. Throughout this particular movement the geometric action of the rubber spring 70 is of the accelerated decrease type, that is, as the tubular supporting structure 16 passes through increments of downward movement the rate of decrease of the resilient force tending to push the bucket seat or saddle 15 downwardly decreases.

By this means, so far as vertical forces are concerned, the bucket seat or saddle 15 is free to "float" along solely under the influence of gravity (plus whatever vertical momentum forces are present), this feature being of particular significance when it is realized that the occupant is also, at the time, solely under the influence of gravity (plus whatever vertical momentum forces are present). The consequence is that within this particular range of movement the occupant of the seat moves vertically up and down with the same acceleration and deceleration as the seat and hence without changing the pressure between the occupant and the seat. Such a desirable result is quite different from that obtained from conventional seat suspensions in which the vehicle drags or jerks the seat down whenever the strains imposed on the seat are negative. With the present suspension no such negative forces tending to pull the seat downwardly are present.

The engagement of the pins 36 with the ends 39, 39a of the slots 38, 38a limits the upward movement of the bucket seat 15. Such stops for limiting the upward movement of the bucket seat has a number of important advantages: First, the stops are provided at each side of the seat structure and without these stops at each side of the suspension, the bucket seat 15 could lurch. Second, the stops hold the rubber springs against complete unloading and hence permit of preloading the rubber springs to the desired degree, this preloading being obtained by adjusting the reversely threaded screw 88 to turn the anchoring plates 80 of the rubber springs 70 in reverse directions relative to each other. One of the advantages of so adjustably preloading the rubber springs 70 is to obtain the desired range of motion in the seat suspension. Thus the seat can be made to operate in a range of 3 inches, 4 inches, 7 inches, etc. Another advantage of so adjustably preloading the spring against a positive stop for the upward movement of the seat is that the seat can be adjusted to the proper height for the steering wheels and other controls to suit an individual driver. Third, upon excessive leaning of the tractor the upward stops for the movement of the seat also causes the seat to lean with the tractor to a limited degree, so that the driver is aware when his tractor leans excessively. Complete leveling of the seat under all conditions is highly undesirable, particularly as the driver may be unaware that his tractor is leaning excessively as when traversing a side hill.

The engagement of the front plate 43 of the U-shaped bracket 40, and also its reinforcing plate 49, with the rubber bumper 124 (Fig. 3) limits the downward movement of the seat. Such a stop to limit the downward movement of the seat has three important advantages. First a positive stop for the downward movement of the seat prevents an accelerated rate of rebound. Second by using a rubber bumper, metal to metal contact on bottoming of the seat is prevented. Third, the provision of such a bottoming stop 124 keeps the springs and parts within a practical operating range of movement. Thus, the parts of the seat are limited in their movement to the available space, the space provided by the car manufacturer being very limited. In this connection there are no standards for seats in the automotive or farm tractor field and with all seat designs it is necessary to hold the movement of all parts within the very limited space available. Also it is undesirable to permit movement of any parts of the seat suspension beyond that range which is necessary. The use of the rubber stop 124 limits the movement of the parts to the required range and also provides a cushioned deceleration of the bucket seat 15 when it bottoms.

It will also be appreciated that the use of the stops to limit the upward movement of the bucket seat 15 and the rubber cushion 124 to limit the downward movement of this bucket seat all contribute to keeping the movement of the parts of the suspension in the range in which the suspension is most effective.

As previously indicated, the use of the thrust collar 66 is of particular importance in providing a thrust bearing for each of the fulcrum rods 35. This thrust bearing prevents the body of the rubber spring 70 from lengthening out upon being loaded, rubber springs having such tendency to lengthen out. The use of these thrust bearings 66 has the following three advantages: First, the life of each rubber spring is materially lengthened because if the rubber spring were permitted to lengthen each time it was subjected to a rotary movement it would gradually distort from its optimum form and become less effective with a resulting shortened life. Second, the thrust bearings eliminate the need for a shock absorber with the suspension as illustrated. Third, the thrust friction of these thrust bearings increases in proportion to spring deflection, and hence these thrust bearings have increasing effectiveness in both preventing elongation of the springs and also in rendering shock absorbers unnecessary due to this fact.

The construction of the crank arm structures 33 and the relation of each of these crank arm structures to the U-shaped bracket 40 and also the rubber springs 70 is also important in securing a compact, light weight, low cost structure. Thus it will be noted that the one piece U-shaped bracket 40 with its integral depending members or plates 43, 44 provides a light weight and strong support for the spaced bearings 46, 51 of the fulcrum rods 35 of the crank arm structure. It will further be seen that by arranging each crank arm structure so that the primary crank arm 33 is outboard and the secondary crank arm 58 inboard of the U-shaped supporting bracket 40, the bearings 46, 51 are loaded in such manner as to avoid undue wear. This arrangement also permits the rubber springs 70 to be arranged inboard rather than outboard of the U-shaped bracket 40 and also permits both the thrust bearing 66 and the preloading mechanism for the rubber springs to be arranged inboard with relation to the U-shaped bracket 40. At the same time the parts of the seat can readily be assembled and are readily accessible for removal when repair or replacement is required.

It will also be noted that the crank arm structure is considerably simplified by forming one crank arm 34, the fulcrum rod 35 and crank rod 32 of a single rod and by connecting the free ends of these rods with the secondary crank arm 58. It will further be noted that the interconnection of the crank arm structures to oscillate in unison is obtained by the simple expedient of cutting intermeshing gear teeth in the opposing ends of the secondary crank arms 58. It will also be seen that extremely low cost shackle structures are provided by the use of the companion shackle plates 24, 24a welded together and that at the same time the fore-and-aft spacing of the bearings 28 and 30 relative to the bearings 29 and 31 is of such extent as to avoid undesirable corner loading of these bearings and to assure uniform loading of the different parts of the suspension and a long life time of service.

It will also be noted that the present invention provides resilient support for the bucket seat or saddle in the form of simple and sturdy rubber torsion springs which can be produced at low cost and are secured both to the seat part of the seat structure and also to the crank arms of the suspension in a simple and effective manner and in a position where they are readily accessible and adjustable. Further, the suspension as a whole can be readily designed to have any desired characteristics within an operative range. Thus, any desired resistance curve can be obtained by making the crank arms 34 and 58 of a corresponding length and any desired range of movement can be obtained by selecting a rubber spring 70 of such diameter as to provide the angular crank arm movement which produces such desired range of movement. The use of the rubber spring 70 in the form shown and in the illustrated relation to the crank arms 34, 58, shackle structures 23, and the crank arm rods 32 provides the ability to produce any desired spring action in a very simple and inexpensive seat suspension.

It will also be seen that full advantage is taken throughout of simple and inexpensive stampings and simple and inexpensive bent rods as well as simple and inexpensive welded joints and that at the same time the suspension can readily be taken apart and replacements made at low cost. Thus, the rubber springs can be removed by the simple expedient of removing the pins 68 and nuts 62 which permits the rearward withdrawal of the U-shaped yokes 33 to permit of withdrawing each rubber body 70 together with its plates 75 and 80 as well as its pins 78 and the adjusting screw 88. This adjusting screw can then be removed from these rubber bodies by the simple expedient of pulling the pins 86 which secure the swing nuts 85 of the adjusting screw 88 to the arms 82 of the rear plate 80 of these rubber springs. The bucket seat or saddle 15 can also be readily removed, together with the adjusting mechanism 42, by the simple expedient of removing the four bolts 92.

From the foregoing it will be seen that the present invention provides an improved seat structure which is particularly applicable to rough riding vehicles and provides controlled vertical and lateral cushioning in such manner as to produce the maximum safety and comfort and leave the occupant in full control of all control levers and wheels. The seat structure is also simple, and inexpensive, not subject to breakdown or loss of utility, and can be produced at low cost.

I claim:

1. A seat structure, comprising a seat part, a base part, a pair of one-piece U-shaped crank arms arranged in horizontally spaced relation to each other and having their adjacent ends severally formed to provide generally horizontal and parallel fulcrum rods and remote ends severally formed to provide crank rods arranged generally parallel with said fulcrum rods, means including at least one shackle arranged to connect said crank rods with one of said parts, a pivotal connection between each of said fulcrum rods and the other of said parts, a second crank arm connecting the free ends of each of said rods of each U-shaped crank arm, a rubber torsion spring surrounding each of said fulcrum rods, means securing one end of each of said rubber torsion springs to the corresponding one of said second crank arms, an adjusting arm fixed to the other end of each of said rubber springs, and means arranged to adjustably interconnect said adjusting arms.

2. A seat structure, comprising a seat part, a base part, a pair of one-piece U-shaped crank arms arranged in horizontally spaced relation to each other and having their adjacent ends severally formed to provide generally horizontal and parallel fulcrum rods and remote ends severally formed to provide crank rods arranged generally parallel with said fulcrum rods, means including at least one shackle arranged to connect said crank rods with one of said parts, a pivotal connection between each of said fulcrum rods and the other of said parts, a second crank arm connecting the free ends of each of said rods of each U-shaped crank arm, a rubber torsion spring surrounding each of said fulcrum rods, means securing one end of each of said rubber torsion springs to the corresponding one of said second crank arms, an adjusting arm fixed to the other end of each of said rubber springs, and means arranged to adjustably interconnect said adjusting arms, comprising a swivel nut pivotally secured to each of said adjusting arms to swing about an axis generally parallel with said fulcrum rods, said nuts being provided, respectively, with right and left threads, and an adjusting screw having reversely threaded ends respectively fitting said nuts.

3. A seat structure, comprising a seat part, a base part, a pair of one-piece U-shaped crank arms arranged in horizontally spaced relation to each other and having their adjacent ends severally formed to provide generally horizontal and parallel fulcrum rods and remote ends severally formed to provide crank rods arranged generally parallel with said fulcrum rods, means including at least one shackle arranged to connect said crank rods with one of said parts, a pivotal connection between each of said fulcrum rods and the other of said parts, a second crank arm connecting the free ends of each of said rods of each U-shaped crank arm, a rubber torsion spring surrounding each of said fulcrum rods, a plate secured to one end of each of said rubber torsion springs, a pin fixed to and projecting from each of said plates axially into a hole provided in the corresponding one of said second crank arms, an adjusting arm fixed to the other end of each of said rubber torsion springs, a swivel nut pivotally secured to each of said adjusting arms to swing about an axis generally parallel with said fulcrum rods, said nuts being provided, respectively, with right and left threads, and an adjusting screw having reversely threaded ends respectively fitting said nuts.

4. A seat structure, comprising a seat part, a base part, a pair of horizontally spaced metal rods each bent into U-shaped form to provide a crank arm and generally parallel crank and fulcrum rods projecting in the same horizontal direction from opposite ends of said crank arm, said fulcrum rods being arranged adjacent each other and said crank rods being located remote from each other, means arranged to pivotally connect each of said crank rods with one of said parts and including at least one shackle, a flat metal second crank arm connecting the free ends of each of said rods of each U-shaped metal rod, a rubber torsion spring surrounding each of said fulcrum rods, a plate vulcanized to one end of each of said torsion springs, a pin fixed to and projecting axially from each of said plates into a hole provided in the corresponding one of said second crank arms, an adjusting arm fixed to the other end of each of said rubber torsion springs, a swivel nut pivotally secured to each of said adjusting arms to swing about an axis generally parallel with said fulcrum rods, said nuts being provided, respectively, with right and left threads, and an adjusting screw having reversely threaded ends respectively fitting said nuts.

5. A seat structure, comprising a seat part, a base part, a pair of horizontally spaced metal rods each bent into U-shaped form to provide a crank arm and generally parallel crank and fulcrum rods projecting in the same horizontal direction from opposite ends of said crank arm, said fulcrum rods being arranged adjacent each other and said crank rods being located remote from each other, means arranged to pivotally connect each of said crank rods with one of said parts and including at least one shackle, a flat metal second crank arm connecting the free ends of each of said rods of each U-shaped metal rod, the adjacent ends of said second crank arms projecting toward each other, gear teeth on the ends of said second crank arms projecting toward each other and inter-meshing with one another, and spring means yieldingly resisting movement of said seat part toward said base part.

6. A seat structure, comprising a seat part, a base part, a pair of horizontally spaced metal rods each bent into U-shaped form to provide a crank arm and generally parallel crank and fulcrum rods projecting in the same horizontal direction from opposite ends of said crank arm, said fulcrum rods being arranged adjacent each other and said crank rods being located remote from each other, means arranged to pivotally connect each of said crank rods with one of said parts and including at least one shackle, a flat metal second crank arm connecting the free ends of each of said rods of each U-shaped metal rod, the adjacent ends of said second crank arms projecting toward each other, gear teeth on the ends of said second crank arms projecting toward each other and inter-meshing with one another, a rubber torsion spring surrounding at least one of said fulcrum rods, means securing one end of said rubber torsion spring to the corresponding one of said second crank arms and means operatively connecting the other end of said rubber spring with the other of said parts to yieldingly resist movement of said seat part toward said base part.

7. A seat structure, comprising a seat part, a base part, a bracket arranged below said seat part, and connected with one of said parts and having horizontally spaced vertical members, a pair of generally parallel fulcrum rods arranged adjacent each other and each journalled at its opposite ends in said vertical members, a crank arm fast to each of said fulcrum rods and in the loaded position of the seat part projecting horizontally away from each other, a crank rod at the free end of each of said crank arms and arranged generally parallel with said fulcrum rods, means including at least one shackle connecting said crank rods with the other of said parts, spring means resiliently resisting movement of said seat part toward said base part, and means adjustably connecting said bracket with said one of said parts and permitting said bracket and said one of said parts to be fixed at different relative positions fore-and-aft of said seat structure.

8. A seat structure, comprising a seat part, a base part, a U-shaped metal bracket having a horizontal central part arranged under and connected with said seat part and having vertical plates depending from its fore-and-aft edges, respectively, and extending transversely of the seat structure, a pair of generally parallel fulcrum rods journalled in said vertical plates and arranged fore-and-aft of the seat structure, a crank arm fast to each of said fulcrum rods and in the normal loaded position of the seat part projecting horizontally away from each other, a crank rod at the free end of each of said crank arms, shackles connecting said crank rods with said base part, spring means resiliently resisting movement of said seat part toward said base part and means adjustably connecting said seat part to said horizontal central part of said bracket and permitting said seat part to be fixed at different positions fore-and-aft of said seat structure along said bracket.

9. A seat structure, comprising a seat part, a base part, a bracket arranged below said seat part and secured to one of said parts and having rigid horizontally spaced vertical members, a pair of generally parallel fulcrum rods bridging and journalled in said vertical members and extending in spaced generally parallel relation to each other, a crank arm fast to each of said fulcrum rods and in the normal loaded position of the seat part projecting horizontally away from each other, a crank rod at the free end of each of said crank arms, means including at least one shackle connecting said crank rods with the other of said parts, a rubber torsion spring surrounding each of said fulcrum rods and interposed between said depending members, means fixing one axial end of each rubber torsion spring to the corresponding crank arms, an adjusting arm connected to the other end of each of said rubber torsion springs and means adjustably interconnecting said adjusting arms.

10. A seat structure, comprising a seat part, a base part, a bracket arranged below said seat part and secured to one of said parts and having spaced rigid vertical members, a pair of fulcrum rods journalled in said vertical members and arranged in generally parallel spaced relation, a first crank arm fast to each of said fulcrum rods externally of said bracket, a second crank arm fast to each of said fulcrum rods and arranged between said vertical members, a crank rod connecting the free ends of said first and second crank arms of each torsion rod, means including at least one shackle arranged to connect said crank rods with the other of said parts, and spring means yieldingly resisting movement of said seat part toward said base part.

11. A seat structure, comprising a seat part, a base part, a bracket arranged below said seat part and secured to one of said parts and having spaced rigid vertical members, a pair of fulcrum rods journalled in said vertical members and arranged in generally parallel spaced relation, a first crank arm fast to each of said fulcrum rods externally of said bracket, a second crank arm fast to each of said fulcrum rods and arranged between said vertical members, a crank rod connecting the free ends of said first and second crank arms of each torsion rod, means including at least one shackle arranged to connect said crank rods with the other of said parts, and spring means yieldingly resisting movement of said seat part toward said base part, comprising a rubber torsion spring surrounding each of said fulcrum rods and interposed between said vertical members and also interposed between said first and second crank arms, means arranged to secure one axial end of each of said rubber torsion springs to the corresponding second crank arm, and means securing the other axial ends of said rubber torsion springs together.

12. A seat structure, comprising a seat part, a base part, a bracket arranged below said seat part and secured to one of said parts and having rigid, horizontally spaced, vertical members, a pair of one piece, U-shaped crank arms each having one end formed to provide a crank rod and its other end formed to provide a fulcrum rod arranged generally parallel with said crank rod, a bearing at each side of each of said vertical members and each arranged in alinement with a companion bearing to journal one of said fulcrum rods in both of said vertical members with the cross part of said U-shaped crank arm arranged on the side of one of said vertical members remote from the other vertical member, a secondary crank arm connecting the free ends of said rods and interposed between said vertical members, means including at least one shackle arranged to connect said crank rods with the other of said parts, and spring means yieldingly resisting movement of said seat part toward said base part.

13. A seat structure, comprising a seat part, a base part, a bracket arranged below said seat part and secured to one of said parts and having rigid, horizontally spaced, vertical members, a pair of one piece, U-shaped crank arms each having one end formed to provide a crank rod and its other end formed to provide a fulcrum rod arranged generally parallel with said crank rod, a bearing at each side of each of said vertical members and each arranged in alinement with a companion bearing to journal one of said fulcrum rods in both of said vertical members with the cross part of said U-shaped crank arm arranged on the side of one of said vertical members remote from the other vertical member, a secondary crank arm connecting the free ends of said rods and interposed between said vertical members, means including at least one shackle arranged to connect said crank rods with the other of said parts, and spring means yieldingly resisting movement of said seat part toward said base part, comprising a rubber torsion spring surrounding each of said fulcrum rods and interposed between said vertical members and also interposed between the corresponding U-shaped crank arm and secondary crank arm, means arranged to secure one axial end of each of said rubber torsion springs to the corresponding secondary crank arm, a plate vulcanized to the other axial end of each of said rubber torsion springs, a reinforcing plate secured to the vertical member interposed between said U-shaped and secondary crank arms and engaging both of said vulcanized plates, and means securing said vulcanized plates together.

14. A seat structure comprising a seat part, a base part, a bracket arranged below said seat part and secured to one of said parts and having rigid, horizontally spaced, vertical members, a pair of one piece, U-shaped crank arms each having one end formed to provide a crank rod and its other end formed to provide a fulcrum rod arranged generally parallel with said crank rod, a bearing at each side of each of said vertical members and each arranged in alinement with a companion bearing to journal one of said fulcrum rods in both of said vertical members with the cross part of said U-shaped crank arm arranged on the side of one of said vertical members remote from the other vertical member, a secondary crank arm connecting the free ends of said rods and interposed between said vertical members, means including at least one shackle arranged to connect said crank rods with the other of said parts, and spring means yieldingly resisting movement of said seat part toward said base part, comprising a rubber torsion spring surrounding each of said fulcrum rods and interposed between said vertical members and also interposed between the corresponding U-shaped crank arm and secondary crank arm, means arranged to secure one axial end of each of said rubber torsion springs to the corresponding secondary crank arm, a circular plate vulcanized to the other axial end of each of said rubber torsion springs, a reinforcing plate secured to the vertical member interposed between said U-shaped and secondary crank arms and engaging both of said vulcanized plates, rounded end flanges on said reinforcing plate embracing the opposite edges of said vulcanized plates, an arm secured to each of said vulcanized plates, and an adjustable connection between said last arms.

(References on following page)

References Cited in the file of this patent

UNITED STATES PATENTS

| Number | Name | Date |
|---|---|---|
| 870,692 | Shepard | Nov. 12, 1907 |
| 1,605,802 | Wilde | Nov. 2, 1926 |
| 2,330,482 | Fageol | Sept. 28, 1943 |
| 2,473,500 | Austin | June 21, 1949 |
| 2,596,904 | Krotz | May 13, 1952 |

FOREIGN PATENTS

| Number | Country | Date |
|---|---|---|
| 497,189 | Germany | May 5, 1930 |
| 486,837 | Great Britain | June 10, 1939 |